US008056396B2

(12) United States Patent
Masuda et al.

(10) Patent No.: US 8,056,396 B2
(45) Date of Patent: Nov. 15, 2011

(54) KNOCK DETECTION DEVICE AND KNOCK DETECTION SYSTEM DIAGNOSIS DEVICE

(75) Inventors: Satoshi Masuda, Kariya (JP); Hirohiko Yamada, Okazaki (JP); Shuhei Oe, Kariya (JP); Naoki Kokubo, Nukata-gun (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 424 days.

(21) Appl. No.: 12/368,490

(22) Filed: Feb. 10, 2009

(65) Prior Publication Data
US 2009/0211337 A1    Aug. 27, 2009

(30) Foreign Application Priority Data

Feb. 27, 2008  (JP) .................................. 2008-45418
Mar. 10, 2008  (JP) .................................. 2008-58962

(51) Int. Cl.
*G01M 15/12*  (2006.01)
(52) U.S. Cl. ..................................... 73/35.03; 73/114.07
(58) Field of Classification Search .................. 73/35.01, 73/35.03, 35.04, 35.06, 35.09, 114.02, 114.07
See application file for complete search history.

(56) References Cited

U.S. PATENT DOCUMENTS

| | | | |
|---|---|---|---|
| 6,988,483 B1 | 1/2006 | Hagari | |
| 7,206,691 B2 | 4/2007 | Kaneko et al. | |
| 7,243,529 B2* | 7/2007 | Takemura et al. | ........... 73/35.09 |
| 7,637,247 B2 | 12/2009 | Kaneko et al. | |
| 7,677,083 B2* | 3/2010 | Oe et al. | ....................... 73/35.09 |
| 7,874,200 B2* | 1/2011 | Oe et al. | ....................... 73/35.09 |
| 7,945,379 B2* | 5/2011 | Kaneko et al. | ................ 701/111 |
| 2004/0154376 A1 | 8/2004 | Okuda et al. | |
| 2006/0117834 A1 | 6/2006 | Goto | |
| 2006/0185422 A1* | 8/2006 | Iwade et al. | ................. 73/35.09 |
| 2007/0012090 A1 | 1/2007 | Yoshihara et al. | |
| 2007/0214869 A1* | 9/2007 | Kaneko et al. | ............... 73/35.09 |
| 2008/0276689 A1* | 11/2008 | Tanaya et al. | ................ 73/35.09 |

(Continued)

FOREIGN PATENT DOCUMENTS

JP    62-203021 A    9/1987

(Continued)

OTHER PUBLICATIONS

Masuda et al, U.S. Appl. No. 12/388,616, filed Feb. 19, 2009.

(Continued)

*Primary Examiner* — Eric S McCall
(74) *Attorney, Agent, or Firm* — Nixon & Vanderhye P.C.

(57) ABSTRACT

An output of a knock sensor is A/D converted in a specified knock determination range. In a time-frequency analysis part, data of frequency, time, and vibration intensity are extracted at the same time from the knock sensor output signal and the time-varying patterns of vibration intensities in multiple frequency ranges are extracted. An edge direction and an edge intensity are computed by an edge extraction processing. A correlation value expressing a correlation between time-varying patterns of vibration intensities in multiple frequency ranges and a reference model expressing the feature of knock is computed in a mutual correlation/knock determination part. The correlation value is compared with a determination threshold. When the correlation value is larger than the determination threshold, it is determined that knock is caused. When the correlation value is not larger than the determination threshold, it is determined that knock is not caused.

8 Claims, 9 Drawing Sheets

U.S. PATENT DOCUMENTS

2008/0294328 A1* 11/2008 Kaneko et al. ............... 701/111
2009/0150058 A1* 6/2009 Kaneko et al. ............... 701/111

FOREIGN PATENT DOCUMENTS

| JP | 2004-270626 | | 9/2004 |
| JP | 2005-188297 | | 7/2005 |
| JP | 2006-161649 | A | 6/2006 |
| JP | 2006-264402 | A | 10/2006 |

OTHER PUBLICATIONS

German Office Action dated Aug. 27, 2010 issued in corresponding German Application No. 10 2009 001 188.9-52 with English Translation.

Office Action (2 pgs.) dated Jul. 20, 2011 issued in corresponding Japanese Application No. 2008-058962 with an at least partial English-language translation thereof (2 pgs.).

* cited by examiner

KNOCK DETECTION DEVICE AND KNOCK DETECTION SYSTEM DIAGNOSIS DEVICE

CROSS-REFERENCE TO RELATED APPLICATION

This application is based on Japanese Patent Applications No. 2008-45418 filed on Feb. 27, 2008, and No. 2008-58962 filed on Mar. 10, 2008, the disclosures of which are incorporated herein by reference.

FIELD OF THE INVENTION

The present invention relates to a knock detection device for an internal combustion engine. The knock detection device detects a knock on the basis of a time-varying pattern of a vibration intensity extracted from an output signal of a knock signal output device. The present invention also relates to a knock detection system diagnosis device for determining whether a knock signal output device is faulty on the basis of the vibration intensities in multiple frequency ranges extracted from the output signal of the knock signal output device.

BACKGROUND OF THE INVENTION

As described in JP-2005-188297A, when a knock is caused, a phenomenon called "a low frequency shift" is caused. In the low frequency shift, a peak frequency of a vibration component specific to the knock gradually shifts to a lower frequency side. When a peak frequency of vibration component of one knock frequency range extracted from the output signal of the knock sensor gradually shifts to a lower frequency side, it is determined that a knock is caused.

JP-2006-29158A corresponding to U.S. Pat. No. 6,988,483B1 describes an apparatus detecting a faulty of a knock sensor. This apparatus is provided with a bias means for pulling up and down an output of a knock sensor. A determination is made as to whether the knock sensor is faulty on the basis of the direct current component of the bias means.

JP-2004-270626A describes an apparatus detecting a faulty of a knock sensor. In this apparatus, a counter counts the number of times when the output signal of a knock sensor is smaller than a determination value for each cylinder. When the count value of the counter becomes larger than a specified value, it is determined that the knock sensor is faulty.

Figure 4:
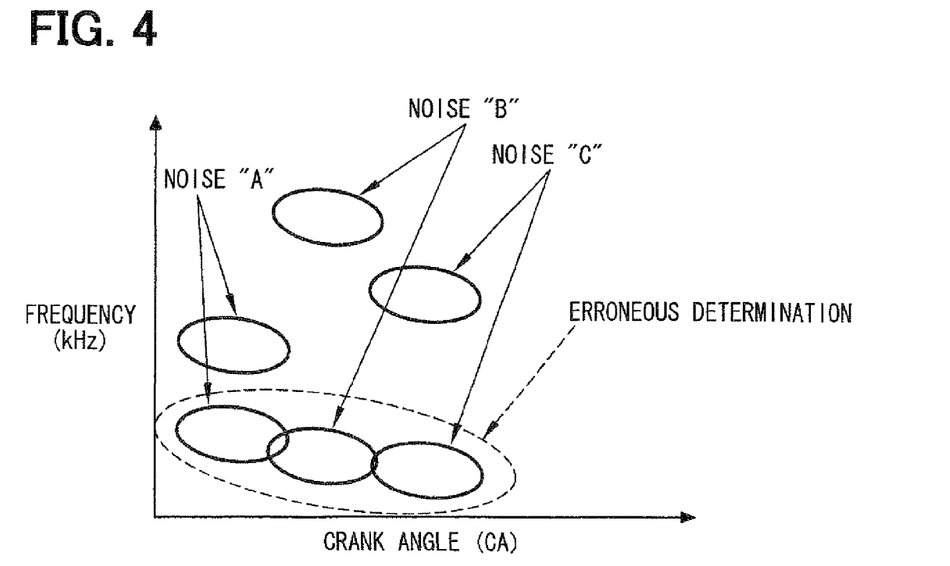
FIG. 4 is a graph showing an example in which when the time-varying pattern of vibration intensity is extracted from only one frequency range, an erroneous determination that knock is caused is made due to noises being superimposed on the output signal of the knock sensor.

An internal combustion engine is provided with various systems such as a variable valve timing controller and a super-charger in order to improve an output, a fuel economy and an environmental performance. A direct injection engine varies fuel injection timing according to a combustion mode. Thus, many kinds of noises tend to superimpose on the signal of the knock sensor in a knock determination range. However, in the knock detection apparatus described in JP-2005-188297A, it is only determined whether a vibration component of one knock frequency range shifts to a lower frequency side in time sequence. Thus, as shown in FIG. 4, when a plurality of noises are superimposed on the signal of the knock sensor in time sequence in one knock determination range, there is a possibility of making an erroneous determination that one continuous vibration component will shift apparently to a lower frequency side. Therefore, when it is only determined whether the vibration component of one frequency range shifts to a lower frequency side, there is a possibility of making an erroneous determination that a knock is caused.

SUMMARY OF THE INVENTION

The present invention is made in view of the above matters, and it is an object of the present invention to provide a knock detection device for an internal combustion engine, which can avoid an erroneous knock determination due to noises being superimposed on the output signal of a knock signal output device, even if the noises increase. Hence knock determination accuracy is enhanced.

Another object of the present invention is to provide a knock detection system diagnosis device capable of determining whether a knock signal output device is faulty with a high accuracy.

According to the present invention, a knock detection device includes a knock signal output means for outputting an output signal of which waveform is varied according to a knock caused while the internal combustion engine is operated. The device includes a multiple-frequency-ranges vibration intensity extraction means for extracting time-varying patterns of vibration intensities in multiple frequency ranges from an output signal of the knock signal output means. The device further includes a knock determination means for evaluating a correlation between the time-varying patterns of vibration intensity in multiple frequency ranges and a reference model expressing a feature of the knock. The knock determination means makes a knock determination on the basis of the correlation.

When knock is caused, not only a knock vibration component of a basic frequency of the knock (first-order resonance frequency which is determined by the diameter of the bore of a cylinder and which is about, for example, 7.5 kHz), but also knock vibration components develop at the same time in second-order and higher-order resonance frequency ranges. A phenomenon that multiple noises are continuously caused like a low frequency shift is not a phenomenon that develops in multiple frequency ranges at the same time but a phenomenon that develops only in a portion of frequency ranges.

According to the present invention, the time-varying patterns of vibration intensities in multiple frequency ranges are extracted from the output signal of the knock signal output means, and the correlation between the time-varying patterns of vibration intensities in multiple frequency ranges and a reference model for expressing a feature of the knock is evaluated. A knock determination is made on the basis of the correlation. Thus, even if a low frequency shift that cannot be distinguished from the knock is developed in any one of frequency range due to a noise being superimposed on the output signal of the knock signal output means, it is possible to prevent making an erroneous determination that the low frequency shift developed by the noise is the knock and hence to increase a knock determination accuracy.

In the present invention, multiple band pass filters may be used as the multiple-frequency-ranges vibration intensity extraction means for extracting the time-varying patterns of vibration intensities in multiple frequency ranges from the output signal of the knock signal output means. Alternatively, the multiple-frequency-ranges vibration intensity extraction means may perform a time-frequency analysis of the output signal of the knock signal output means to extract the time-varying patterns of vibration intensities in multiple frequency ranges. The time-frequency analysis includes a short-time Fourier transform (STFT), a wavelet transform, a Wigner distribution. By performing the time-frequency analysis, the data of frequency, time, and vibration intensity can be extracted at the same time from the output signal of the knock signal output means, and the time-varying patterns of vibration intensities in multiple frequency ranges can be produced.

The reference model can be established based on at least any one of contours, areas, directions of change (directions of low frequency shift), and lengths of contours of the time-varying patterns of vibration intensities in multiple frequency ranges. The correlation between the time-varying patterns of vibration intensities in multiple frequency ranges and the reference model can be quantitatively determined.

The knock determination means evaluates the correlation between the time-varying patterns of vibration intensities in multiple frequency ranges and the reference model expressing a feature of the knock based on a mutual correlation or a predetermined correlation value computing equation. With this, the correlation can be quantitatively evaluated by the computation processing.

The knock determination means may compares a correlation value with a determination threshold to make a knock determination. The correlation value evaluates the correlation between the time-varying patterns of vibration intensities in multiple frequency ranges and the reference model expressing a feature of the knock.

Generally, the condition in which the knock is easily caused is changed according to the operating condition of the internal combustion engine (engine revolution speed, load, or the like). Thus, the determination threshold may be established for each operating condition of the internal combustion engine. With this, the knock determination can be executed under a condition suitable for the operating condition of the internal combustion engine.

The knock determination means may correct the determination threshold according to a knock detection frequency. Generally, in an ignition timing control, the ignition timing advanced when the knock is not detected. The ignition timing is retarded when the knock is detected. Such a process is repeatedly performed to thereby control the ignition timing close to a knock limit. For example, under an operating condition in which the knock detection frequency is low, the determination threshold is established in such a manner that the knock is less easily detected. Thereby the ignition timing is advanced to improve the output and the fuel economy. Under an operating condition in which the knock detection frequency is high, the determination threshold is established in such a manner that the knock is easily detected. Thereby, the ignition timing is retarded to restrict the knock within an allowable range.

When the knock is caused, the vibration intensities in multiple frequency ranges are rapidly increased at the same time. Thus, the knock determination means starts an evaluation of the correlation between the time-varying patterns of vibration intensities in multiple frequency ranges and the reference model from a time when the vibration intensities in the multiple frequency ranges are rapidly increased at the same time. With this, the effect of noises can be further reduced.

With respect to a time-varying pattern in which the timing of a rapid increase in the vibration intensity is shifted and delayed from the timings of the others, the correlation between the time-varying pattern and the reference model is not evaluated. This is because it can be thought that the time-varying pattern in which the timing of the rapid increase in the vibration intensity is shifted and delayed is developed by noises.

Moreover, the evaluation of the correlation between the time-varying pattern of vibration intensities in multiple frequency ranges and the reference model can be continued until a vibration intensity of a frequency range in which the vibration continues to the last attenuates to a value lower than a specified value. With this, the feature quantities (contour, area, direction of change, and length of contour) of the time-varying patterns of the vibration intensity of each frequency range can be extracted with high accuracy in all frequency ranges.

Furthermore, although the reference model may be produced on the basis of a vibration mode of a typical frequency range (for example, basic frequency range), the reference model corresponding to the vibration modes in the multiple frequency ranges may be produced. With this, the correlation can be evaluated by means of the reference model of high accuracy.

The reference model may be corrected by reference model correction means on the basis of a time-varying pattern of a vibration intensity in which a knock is caused. The reference model can be corrected on the basis of the time-varying patterns of vibration intensities in the multiple frequency ranges when it is determined that the knock is caused, so that the accuracy of the reference model can be enhanced on the basis of the data of the actual engine.

According to the present invention, a knock detection system diagnosis device includes: a knock signal output means for outputting an output signal of which waveform is varied according to a knock vibration caused while the internal combustion engine is operated; a multiple-frequency-ranges vibration intensity extraction means for extracting time-varying patterns of vibration intensities in multiple frequency ranges from the output signal of the knock signal output means; and a diagnosis means for evaluating a correlation between the time-varying patterns of vibration intensities in multiple frequency ranges and a reference model expressing a feature of the knock. The time-varying patterns of vibration intensity is extracted by the multiple-frequency-ranges vibration intensity extraction means during a period in which the internal combustion engine is operated under an operating condition in which knock is caused or during a period in which an ignition timing is advanced to compulsorily cause a knock. The diagnosis means determines whether the knock signal output means is faulty on the basis of the correlation.

When a knock can be normally detected on the basis of the correlation during a period in which a knock is actually caused, it can be determined that the knock signal output means is normal. When a knock cannot be normally detected on the basis of the correlation during a period in which a knock is actually caused, it can be determined that the knock signal output means is faulty. Even if a low frequency shift that cannot be distinguished from the knock is caused in any one in the frequency ranges due to the noises being superimposed on the output signal of the knock signal output means, it is possible to prevent making an erroneous determination that the low frequency shift caused by the noises is a knock. With this, a determination can be accurately made as to whether the knock signal output means is faulty according to a determination as to whether the knock can be detected during the period in which the knock is actually caused on the basis of the correlation between the time-varying patterns and the reference model.

The diagnosis means evaluates a correlation between the time-varying patterns of vibration intensities in multiple frequency ranges and a reference model expressing a feature of the knock. The time-varying patterns of vibration intensities are extracted by the multiple-frequency-ranges vibration intensity extraction means during a period in which a vibration noise is caused or during a period in which a vibration noise is compulsorily caused. The diagnosis means determines whether the knock signal output means is faulty on the basis of the correlation. The vibration noise includes, for example, a noise caused when a valve is seated, and a noise caused when an injector directly injects fuel. These vibration noises are characterized in that vibration rises in two frequency ranges at the same timing. Thus, if it is determined whether a time-varying pattern of a vibration intensity correlating with the reference model expressing the feature of the vibration noise can be detected during a period in which the vibration noise is actually caused, it can be determined with high accuracy whether the knock signal output means is faulty.

The ignition timing may be retarded during the diagnosis in order to prevent causing the knock. With this, the diagnosis of the knock signal output means can be performed under a condition where only vibration noise is caused without any knock, so that it is possible to increase the accuracy of diagnosis.

The diagnosis means evaluates a correlation between the time-varying patterns of vibration intensities in multiple frequency ranges and a reference model expressing a feature of an ignition noise. The time-varying patterns of vibration intensities are extracted by the multiple-frequency-ranges vibration intensity extraction means during a period in which the ignition noise is caused or during a period in which the ignition noise is compulsorily caused. The diagnosis means determines whether the knock signal output means is faulty on the basis of the correlation. The ignition noise is a noise that is caused in one frequency range when the ignition timing is excessively retarded, so that when the ignition noise is caused, the knock is not caused. Thus, if it is determined whether a time-varying pattern of a vibration intensity correlating with the reference model expressing the feature of the ignition noise can be detected during a period in which the ignition noise is actually caused, it can be determined with high accuracy whether the knock signal output means is faulty.

The multiple-frequency-ranges vibration intensity extraction means performs a time-frequency analysis of an output signal of the knock signal output means to extract the time-varying patterns of vibration intensities in multiple frequency ranges. The time-frequency analysis includes a short-time Fourier transform (STFT), a wavelet transform, a Wigner distribution. By performing the time-frequency analysis, the data of frequency, time, and vibration intensity can be extracted at the same time from the output signal of the knock signal output means, and the time-varying patterns of vibration intensities in multiple frequency ranges can be produced.

Alternatively, the multiple-frequency-ranges vibration intensity extraction means may process the output signal of the knock signal output means by a plurality of band pass filters extracting a plurality of specified frequency ranges to extract the time-varying patterns of vibration intensities in multiple frequency ranges. With this, the time-varying patterns of vibration intensities in multiple frequency ranges can be also simply extracted from the output signal of the knock signal output means.

The diagnosis means may determines whether the knock signal output means is faulty on the basis of a vibration intensity of at least one frequency range among the vibration intensities in the multiple frequency ranges which are extracted by the multiple-frequency-ranges vibration intensity extraction means during a period in which any one of a knock, a vibration noise, and an ignition noise is caused or during a period in which any one of a knock, a vibration noise, and an ignition noise is compulsorily caused. The frequency range in which a vibration is caused by the knock, the vibration noise, and the ignition noise is an already-known range. When the vibration intensity of a frequency range in which vibration is caused by knock (or vibration noise, or ignition noise) is larger than a determination threshold, the knock signal output means can normally detect the vibration actually caused by the knock (or vibration noise, or ignition noise). Thus, it can be determined that the knock signal output means is normal. If the vibration intensity in the frequency range is not larger than the determination threshold, the knock signal output means is in a state in which the knock signal output means cannot detect vibration actually caused. Thus, it can be determined that the knock signal output means is abnormal.

When it is detected that the knock signal output means is faulty, the fail-safe means performs at least one of: stopping a processing in the multiple frequency ranges vibration intensity extraction means (knock determination processing); retarding an ignition timing; and stopping a knock control. For example, when the knock signal output means is faulty, if the vibration intensity extraction processing (knock determination processing) is stopped, it is possible to prevent making an erroneous knock determination continuously on the basis of the faulty signal of the knock signal output means. If the ignition timing is retarded, it is possible to prevent a knock from being caused. If the knock control is stopped, it is possible to avoid a situation where the ignition timing will be excessively advanced on the basis of the erroneous knock determination result to further impair a state where the knock is caused.

BRIEF DESCRIPTION OF THE DRAWINGS

Other objects, features and advantages of the present invention will become more apparent from the following description made with reference to the accompanying drawings, in which like parts are designated by like reference numbers and in which.

DETAILED DESCRIPTION OF EMBODIMENTS

First Embodiment

Figure 1:
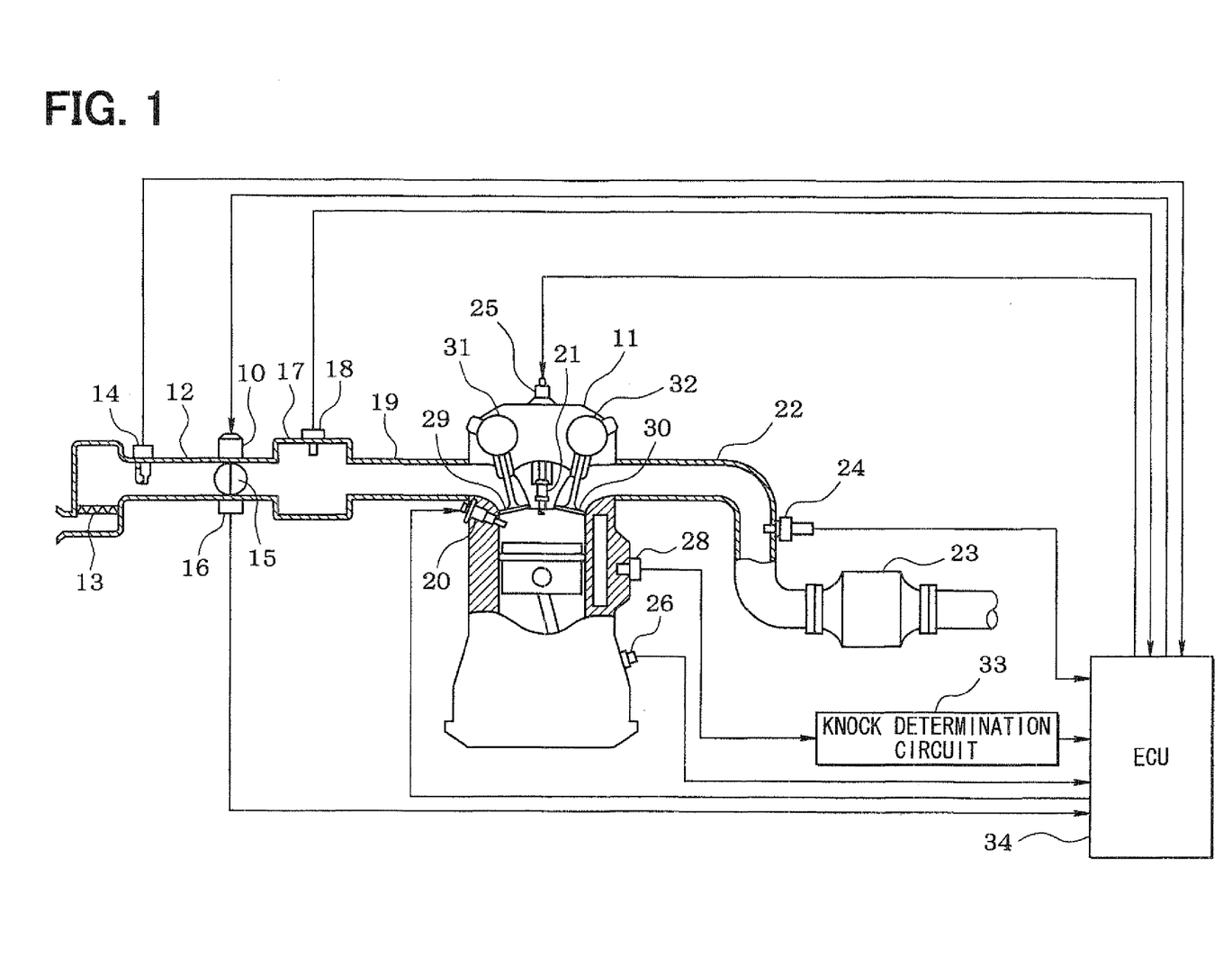
FIG. 1 is a schematic view of an engine control system according to a first embodiment of the present invention.

An embodiment of the present invention will be described hereinafter. Referring to FIG. 1, an engine control system is explained. An air cleaner 13 is arranged upstream of an intake pipe 12 of an internal combustion engine 11. An airflow meter 14 detecting an intake air flow rate is provided downstream of the air cleaner 13. A throttle valve 15 driven by a motor 10 and a throttle position sensor 16 detecting a throttle position are provided downstream of the air flow meter 14.

A surge tank 17 including an intake air pressure sensor 18 is provided down steam of the throttle valve 15. The intake air pressure sensor 18 detects intake air pressure. An intake manifold 19 is connected to the surge tank 17. A fuel injector 20 is mounted on each cylinder for injecting fuel into an interior of the cylinder respectively. A spark plug 21 is mounted on a cylinder head of the engine 11 corresponding to each cylinder. Each spark plug 21 receives high voltage generated by an ignition device 25 to ignite air-fuel mixture in each cylinder.

The engine 11 is provided with an intake valve timing controller 31 which adjusts a valve timing of the intake valve 29, and an exhaust valve timing controller 32 which adjusts valve timing of an exhaust valve 30.

An exhaust pipe 22 of the engine 11 is provided with a three-way catalyst 23 purifying CO, HC, NOx and the like in the exhaust gas. An exhaust gas sensor 24 detecting air-fuel ratio or rich/lean of the exhaust gas is disposed upstream of the three-way catalyst 25. A crank angle sensor 26 is installed on a cylinder block of the engine 11 to output crank angle pulses when a crank shaft rotates a predetermined angle. Based on these crank angle pulses of the crank angle sensor 26, a crank angle and an engine speed are detected.

The cylinder block of the engine 11 is mounted with a knock sensor 28 for detecting knock vibration, and the output signal of the knock sensor 28 is digitally processed by a knock determination circuit 33 to perform a knock determination. The knock sensor 28 corresponds to a knock signal output means. The knock determination result made by the knock determination circuit 33 is inputted to an electronic control unit 34, which is referred to as ECU 34, hereinafter. The ECU 34 includes a microcomputer which executes an engine control program stored in a Read Only Memory (ROM) to control a fuel injection quantity of the fuel injector 20, an ignition timing of the spark plug 21, and a valve timing of the variable valve timing controllers 31, 32. The ECU 34 repeatedly performs a following knock control so that an ignition timing comes close to a knock limit. That is, when the knock determination circuit 33 detects no knock, the ignition timing is advanced, whereas when the knock determination circuit 33 detects a knock, the ignition timing is retarded.

Figure 3:
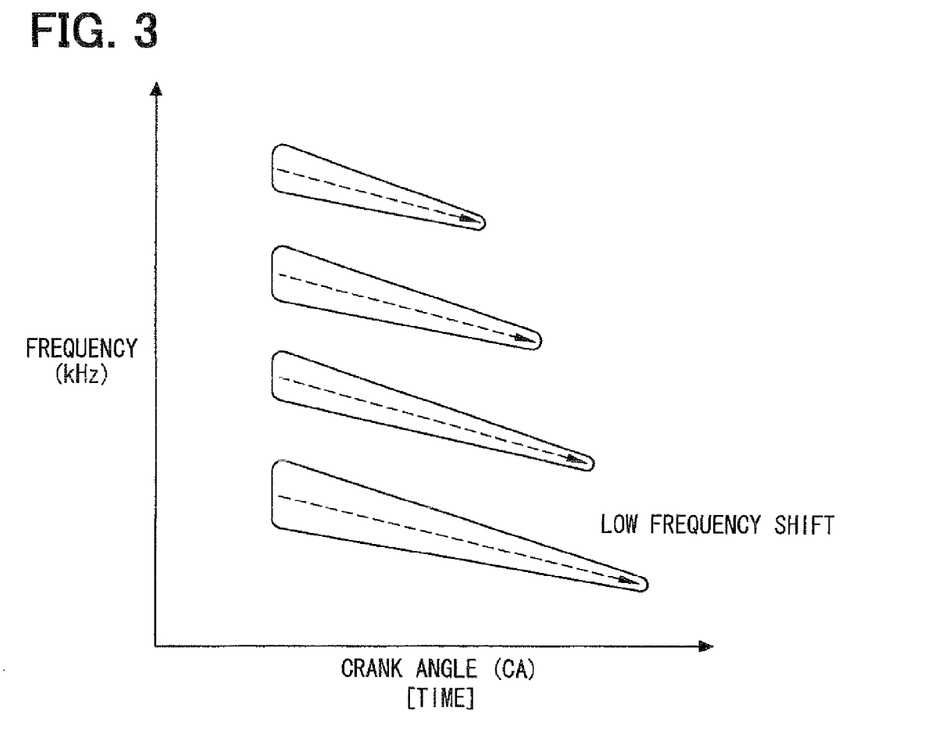
FIG. 3 is a graph schematically showing time-varying patterns of vibration intensity in multiple frequency ranges extracted from output signals of a knock sensor.

As shown in FIG. 3, when knock is caused, not only a knock vibration component of the basic frequency of the knock (first-order resonance frequency determined by the diameter of the bore of the cylinder) but also knock vibration components of the second-order or more, that is, higher-order resonance frequency ranges develop at the same time. When the knock is caused, the low frequency shift occurs. That is, the vibration components of these multiple frequency ranges gradually shift to a lower frequency side. As shown in FIG. 4, when a plurality of noises are superimposed on the output signal of the knock sensor 28 in time sequence within one knock determination range, there is the possibility of making an erroneous determination that one continuous vibration component will apparently causes a low frequency shift. Thus, when it is only determined whether a vibration component of one frequency range causes a low frequency shift, there is a possibility of making an erroneous knock determination.

In the present embodiment, the time-varying patterns of vibration intensity in multiple frequency ranges are extracted from the output signals of the knock sensor 28, and a correlation between the time-varying patterns of vibration intensity in multiple frequency ranges and a reference model for expressing the feature of the knock is evaluated. A knock determination is made on the basis of the correlation.

In the present embodiment, a time-frequency analysis is used to extract the time-varying patterns of vibration intensity in multiple frequency ranges from the output signals of the knock sensor 28. A short-time Fourier transform (STFT), a wavelet transform, a Wigner distribution, or the like is used as the time-frequency analysis.

Figure 2:
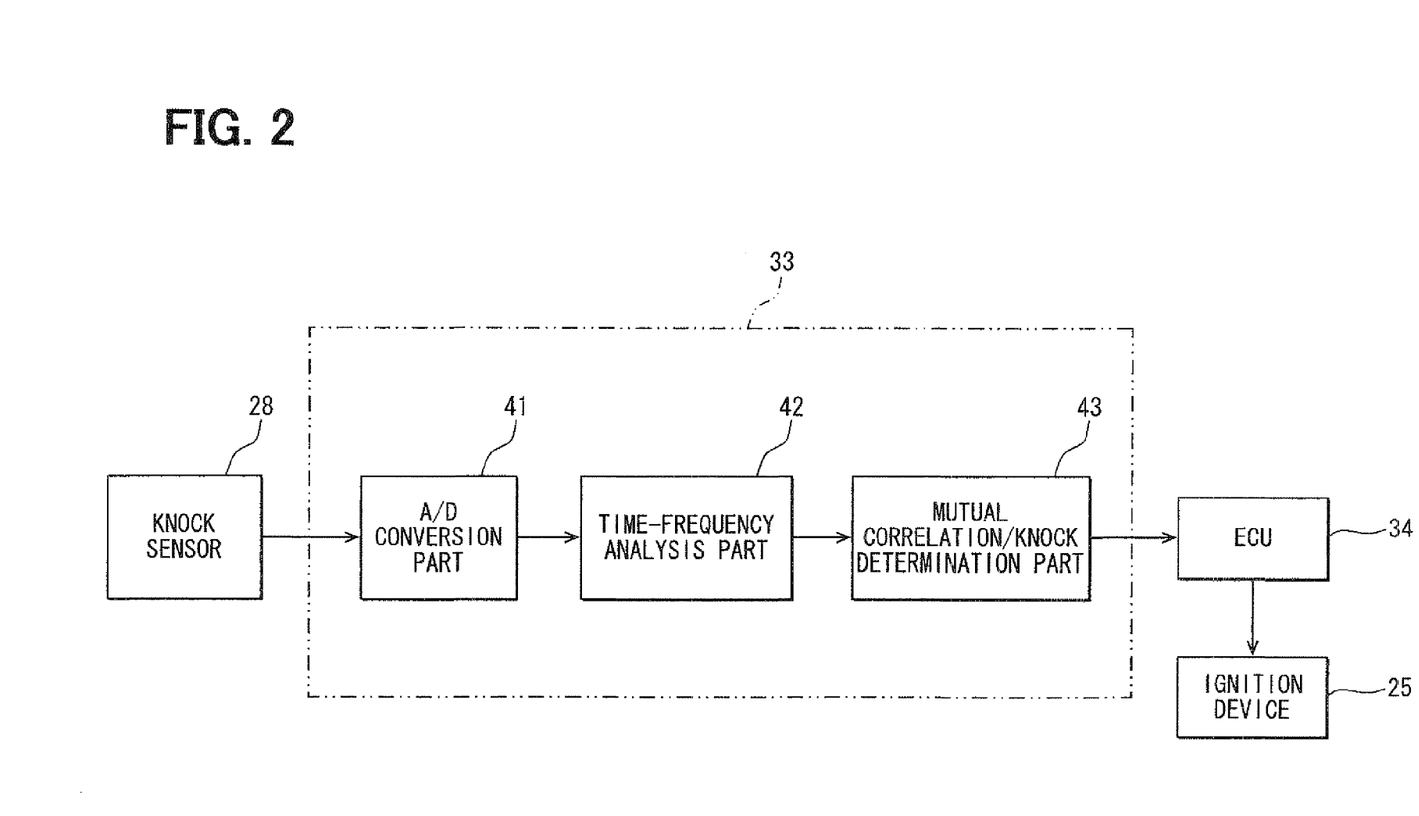
FIG. 2 is a block diagram showing a circuit for processing the output signal of a knock sensor to make a knock determination.

The processing of the time-frequency analysis is performed by a time-frequency analysis part 42 in the knock determination circuit 33. The time-frequency analysis part 42 corresponds to a multiple-frequency-ranges vibration intensity extraction means. The output signal of the knock sensor 28 is converted to a digital value by an A/D conversion part 41. The converted signal is processed by the time-frequency analysis part 42. When a knock is caused, as shown in FIG. 3, time-varying patterns are extracted in the multiple frequency ranges. The frequency ranges in which the time-varying pattern of vibration intensity is extracted include a range of a basic frequency, which is the lowest frequency of the frequencies of the knock vibrations, and the ranges of the second or higher-order resonance frequencies of the knock vibrations. The basic frequency is the first-order resonance frequency determined by the diameter of the bore of the cylinder A correlation between the time-varying patterns of vibration intensity of multiple frequency patterns and the reference model expressing the feature of the knock is evaluated by a mutual correlation/knock determination part 43 on the basis of the analysis result of this time-frequency analysis part 42. Then, a knock determination is made on the basis of the correlation. The mutual correlation/knock determination part 43 corresponds to a knock determination means.

Specifically, an edge extraction technique of image processing is applied to the result of the time-frequency analysis shown in FIG. 3 in order to extract the contours (edges) of the time-varying patterns of vibration intensity in multiple frequency ranges. For example, in FIG. 3, in a case that a time axis (crank angle axis) direction is an x direction, a frequency axis direction is a y direction, and a pixel value at arbitrary coordinates (x, y) is G(x, y), the gradient of density at the coordinates (Δx, Δy) is expressed by the following equations.

$$\Delta x(x,y) = G(x-1,y) - G(x,y)$$

$$\Delta y(x,y) = G(x,y-1) - G(x,y)$$

Edge intensity Vn(x, y) at the arbitrary coordinates (x, y) is expressed by the following equation.

$$Vn(x,y) = \sqrt{\Delta x(x,y)^2 + \Delta y(x,y)^2} \qquad \text{[Equation 1]}$$

An edge direction θn(x, y) at the arbitrary coordinates (x, y) is expressed by the following equation.

$$\theta n(x, y) = \tan^{-1}\left(\frac{\Delta y(x, y)}{\Delta x(x, y)}\right) \qquad \text{[Equation 2]}$$

The edge direction θn(x, y) points from a dark side of a change in the density to a light side. A portion where the gradient of density (Δx, Δy) changes by a specified value or more may be determined to be a contour. Alternatively, a portion where a density change quantity in the adjacent regions changes by a specified value or more may be determined to be a contour. Further, a contour (edge) extraction method may be changed according to an engine speed and/or an engine load.

After the processing of extracting the contours (edges) of the time-varying patterns of vibration intensity in the multiple frequency ranges is finished, a correlation between the time-varying patterns of vibration intensity in multiple frequency ranges and the reference model expressing the feature of the knock is evaluated. A correlation value CRR computed by the following correlation computing equation, which is previously set, is used for the evaluation of this correlation.

$$CRR = \frac{\sum_{x=1}^{end}\sum_{y=1}^{end}\{Vm(x, y) \times \cos\{\theta n(x, y) - \theta m(x, y)\}\}}{\sum_{x=1}^{end}\sum_{y=1}^{end} Vm(x, y)}$$ [Equation 3]

wherein Vm(x, y) is the edge intensity of the reference model at the arbitrary coordinates (x, y), and θm(x, y) is the edge direction of the reference model at the arbitrary coordinates (x, y). The correlation may be evaluated on an edge intensity and on an edge direction at the same time. Alternatively, the correlation may be evaluated for each one.

The reference model is a model expressing the feature of the knock. The feature of the knock includes the following four features.

(1) A vibration intensity increases rapidly.
(2) Knock attenuates logarithmically (vibration continues).
(3) A vibration intensity develops in multiple frequency ranges.
(4) A low frequency shift develops.

This reference model may be made on the basis of data acquired from actual engine or theoretically from simulation or the like.

When a knock is caused, the vibration intensities in multiple frequency ranges become large rapidly at the same time. Thus, it is started to evaluate the correlation between the time-varying patterns of vibration intensities in multiple frequency ranges and the reference model from a time when the vibration densities in the multiple frequency ranges become large rapidly. With this, the effect of noises can be further reduced.

Even within the range in which the correlation is to be evaluated, with respect to a time-varying pattern in which the timing of a rapid increase in the vibration intensity is shifted and delayed from the timings of the others, the correlation between the time-varying pattern and the reference model is not evaluated. This is because it can be thought that the time-varying pattern in which the timing of the rapid increase in the vibration intensity is shifted and delayed is developed by noises.

Moreover, the evaluation of the correlation between the time-varying pattern of vibration intensities in multiple frequency ranges and the reference model can be continued until a vibration intensity of a frequency range in which the vibration continues to the last attenuates to a value lower than a specified value. With this, the feature quantities (contour, area, direction of change, and length of contour) of the time-varying patterns of the vibration intensity of each frequency range can be extracted with high accuracy in all frequency ranges.

Furthermore, although the reference model may be produced on the basis of a vibration mode of a typical frequency range (for example, basic frequency range), the reference model corresponding to the vibration modes in the multiple frequency ranges may be produced. With this, the correlation can be evaluated by means of the reference model of high accuracy.

As the correlation between the time-varying pattern of the vibration intensity and the reference model becomes higher, the correlation value CRR computed by the correlation value computing equation becomes larger and comes close to a maximum value of "1". This correlation value CRR is compared with a determination threshold. If the correlation value CRR is larger than the determination value, it is determined that a knock is caused. If the correlation value CRR is not larger than the determination value, it is determined that no knock is caused. The information of the determination result of the mutual correlations knock determination part 43 is sent to the ECU 34, The ECU 34 repeatedly performs a knock control in which the ignition timing is advanced when no knock is detected and the ignition timing is retarded when a knock is detected, whereby the ignition timing comes close to a knock limit.

Figure 5:
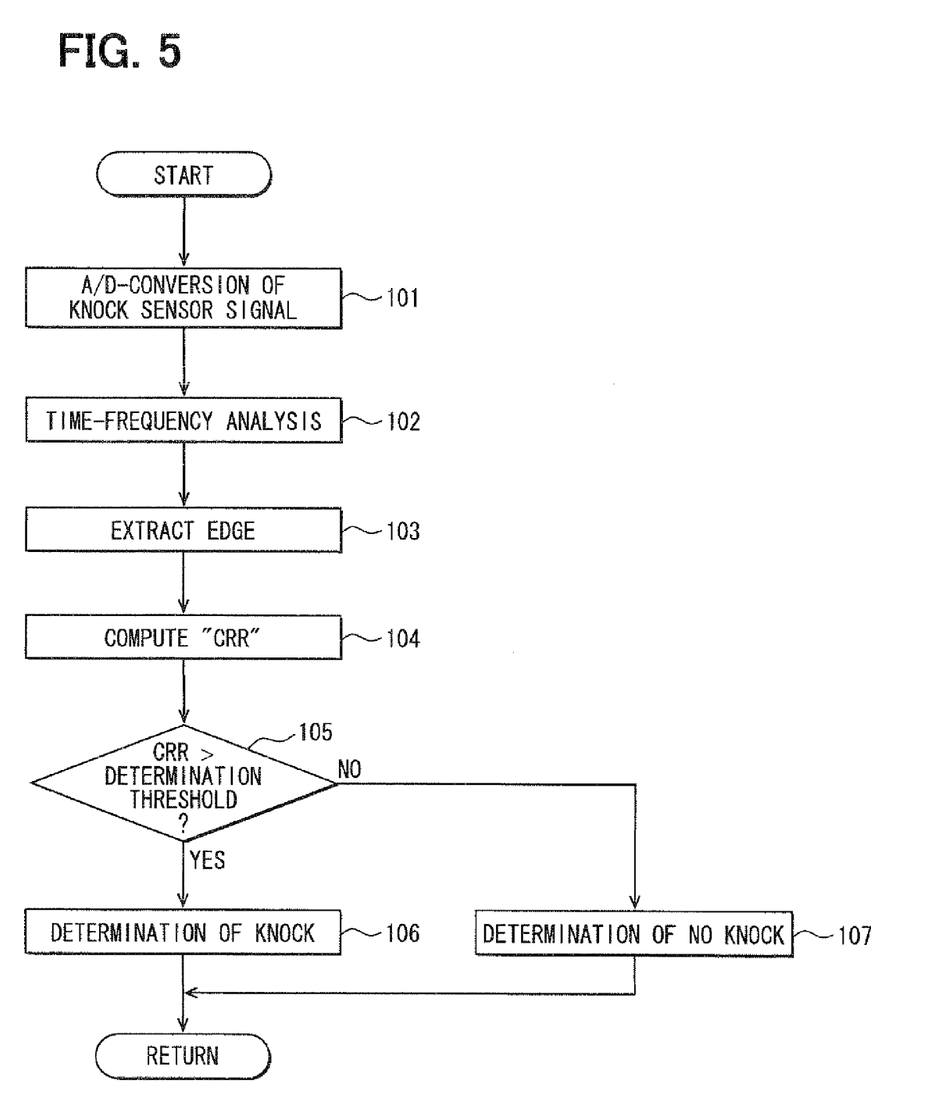
FIG. 5 is a flow chart showing a processing of a knock determination routine.

The above-mentioned knock determination processing is performed by the knock determination circuit 33 according to a knock determination routine shown in FIG. 5. The knock determination routine shown in FIG. 5 is performed for each one ignition of each cylinder. In step 101, the output signal of the knock sensor 28 is converted by the A/D conversion part 41 to a digital signal in a specified knock determination range. In step 102, the time-frequency analysis (STFT, wavelet transform, Wigner distribution, or the like) is performed to extract the data of frequency, time, and vibration intensity at the same time from the output signal of the knock sensor 28, thereby extracting the time-varying patterns of vibration intensity in the multiple frequency ranges. Thereafter, the routine proceeds to step 103 in which the edge extraction processing (contour extraction processing) is performed to compute the edge direction θn (x, y) and the edge intensity Vn(x, y) according to the equation (1) and the equation (2).

Then, the procedure proceeds to step 104 in which the correlation value CRR expressing the correlation between the contours of the time-varying patterns of vibration intensities in the multiple frequency ranges and the reference model expressing the feature of the knock is computed according to the equation (3). Then, the procedure proceeds to step 105 in which the correlation value CRR is compared with the determination threshold. When the correlation value CRR is larger than the determination threshold, the routine proceeds to step 106 in which it is determined that the knock is caused. When the correlation value CRR is not larger than the determination threshold, the routine proceeds to step 107 in which it is determined that no knock is caused. With this manner, even if a low frequency shift that cannot be distinguished from the knock in any one of the frequency ranges is developed due the noises being superimposed on the output signal of the knock sensor 28, it is possible to prevent making an erroneous determination that the low frequency shift developed by the noises is the knock. Thus, the knock determination accuracy is enhanced.

As for the determination threshold, a constant value (fixed value) may be used which is previously set in an adjustment process on the basis of the intensity and the frequency that can be allowed from the sense of hearing of the worker. However, the condition in which the knock is easily caused varies according to the engine operating conditions (engine revolution speed, load, and the like), so that the determination threshold may be set for each of the engine operating conditions. With this, it is possible to determine whether a knock is caused under the knock determination condition suitable for the engine operating condition.

The determination threshold may be corrected according to a knock detection frequency. Under the operating condition in which the knock detection frequency is low, the determination threshold is set large to make it difficult to detect the knock. The ignition timing is advanced to improve the output and the fuel economy. Under the operating condition in which the knock detection frequency is high, the determination threshold is set small to make it easy to detect a knock. The ignition timing is retarded to restrict the knock within an allowance in terms of the sense of hearing.

Alternatively, the reference model may be corrected on the basis of the time-varying patterns of vibration intensities in the multiple frequency ranges when it is determined that a knock is caused. The reference model can be corrected on the basis of the time-varying patterns of vibration intensities in the multiple frequency ranges when it is determined that the knock is caused, so that the accuracy of the reference model can be enhanced on the basis of the data of the actual engine.

In the present embodiment, the correlation value CRR expressing the correlation between the time-varying patterns of the vibration intensities in the multiple frequency ranges and the reference model is computed. Alternatively, a mutual correlation between the time-varying patterns of the vibration intensities in the multiple frequency ranges and the reference model may be computed.

In the present embodiment, the contours (edges) are extracted as the feature quantities of the time-varying patterns of the vibration intensities in the multiple frequency ranges. In addition to this, at least any one of the area, the direction of change (direction of the low frequency shift), and the length of contour may be extracted as a feature quantity. In short, at least any one of the contour, the area, the direction of change, and the length of contour may be extracted as a feature quantity and the reference model may be made by use of the feature quantity. Even when any one of these feature quantities is used, the correlation between the time-varying patterns of the vibration intensities in the multiple frequency ranges and the reference model can be quantitatively determined.

In the present embodiment, the time-frequency analysis is used to extract the time-varying patterns of the vibration intensities in the multiple frequency ranges from the output signal of the knock sensor 28. Alternatively, the time-varying patterns of the vibration intensities in the multiple frequency ranges may be extracted by means of multiple band pass filters corresponding to the multiple frequency ranges.

In the present embodiment, the knock sensor 28 is used as the knock signal output means of which output signal waveform varies according to the knock caused during an engine operation. Alternatively, a cylinder pressure sensor detecting a cylinder pressure or an ion current detection means for detecting ions produced by a combustion of the air-fuel mixture in the cylinder through the ignition plug 21 or the like may be used as the knock signal output means.

Simply, the vibration intensity of a knock portion of each frequency range may be compared with the determination threshold to determine whether a knock is caused. In this case, the determination threshold may be set for each frequency range. Alternatively the total value of vibration intensities of the knock portions of the respective frequency ranges may be compared with the determination threshold to determine whether a knock is caused.

Second Embodiment

Figure 6:
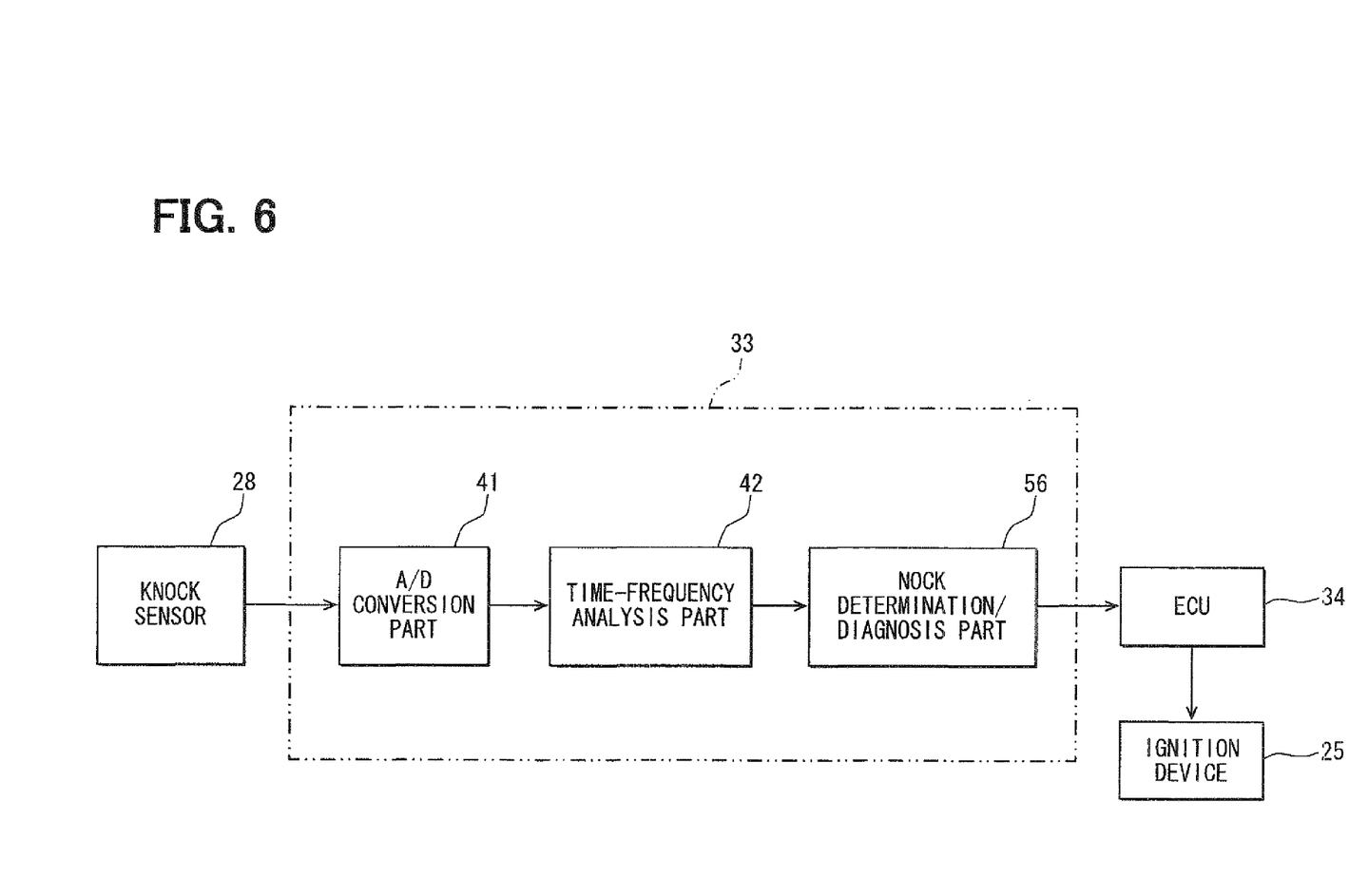
FIG. 6 is a block diagram showing a circuit for processing the output signal of a knock sensor to make a knock determination and a diagnosis according to a second embodiment.

In a second embodiment, a nock determination/diagnosis part 56 evaluates the correlation (correlation value CRR) between the time-varying patterns of the vibration intensities in the multiple frequency ranges and the reference model expressing the feature of the knock on the basis of the analysis result of the time-frequency analysis part 42 during a period in which the engine 1 is operated under a condition in which the knock is caused or during an period in which the ignition timing is advanced to compulsorily cause the knock. Then, it is determined whether the knock sensor 28 is faulty on the basis of the correlation.

In other words, if a knock can be normally detected on the basis of the correlation during a period in which a knock is actually caused, it can be determined that the knock sensor 28 is normal. If a knock cannot be normally detected on the basis of the correlation during a period in which a knock is actually caused, it can be determined that the knock sensor 28 is faulty. Even if a low frequency shift that cannot be distinguished from the knock is caused in any one of the frequency ranges due to the noises being superimposed on the output signal of the knock sensor 28, it is possible to prevent making an erroneous determination that the low frequency shift caused by the noises is a knock. With this, a determination can be accurately made as to whether the knock sensor 28 is faulty according to a determination as to whether the knock can be detected during the period in which the knock is actually caused on the basis of the correlation between the time-varying patterns and the reference model.

Figure 7:
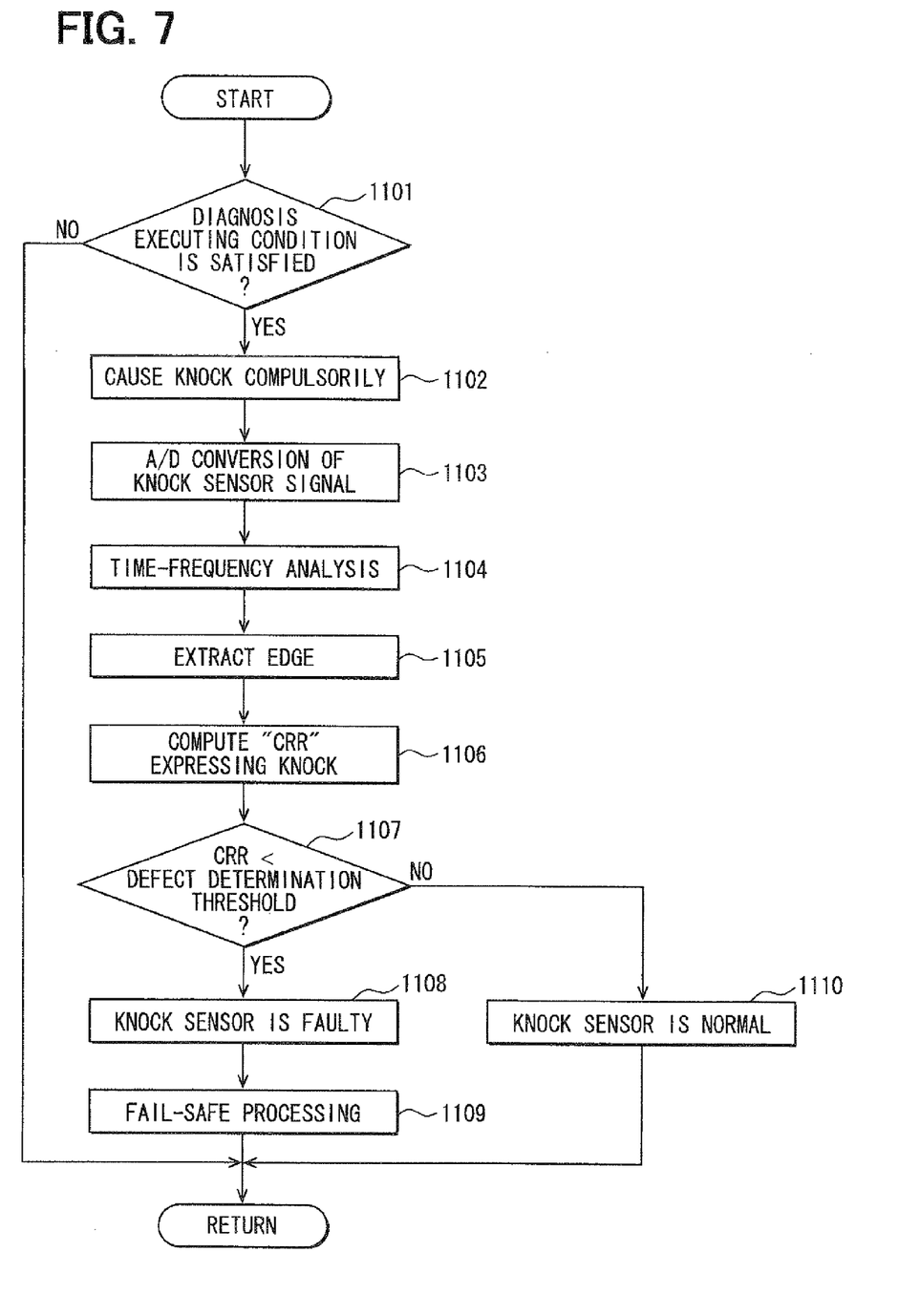
FIG. 7 is a flow chart showing a processing of a diagnosis routine according to a second embodiment.

The above-mentioned diagnosis processing of the knock sensor 28 is performed by the knock determination/diagnosis part 56 according to a diagnosis routine shown in FIG. 7. The diagnosis routine shown in FIG. 7 is performed for each one ignition of each cylinder and functions as a diagnosis means. In step 1101, it is determined whether a diagnosis executing condition is satisfied. This diagnosis executing condition includes, for example, (1) a fault in an ignition system or the like is not detected by the other diagnosis function, and (2) the engine is in an operating state suitable for performing a diagnosis (for example, steady operating state). If the diagnosis executing condition is not satisfied, this routine is finished without performing the subsequent steps.

If the diagnosis executing condition is satisfied, the procedure proceeds to step 1102 in which the ignition timing is advanced to compulsorily cause the knock. Alternatively, the routine may wait until the operating condition in which the knock is caused is satisfied.

Then, the procedure proceeds to step 1103 in which the output signal of the knock sensor 28 is converted to a digital signal by the A/D conversion part 41. In step 1104, the time-frequency analysis (STFT, wavelet transform, Wigner transform) is performed to extract the data of frequency, time, and vibration intensity at the same time from the output signal of the knock sensor 28, thereby extracting the time-varying patterns of vibration intensity in multiple frequency ranges. Then, the procedure proceeds to step 1105 in which the edge extraction processing (contour extracting processing) is performed to compute the edge direction $\theta n(x, y)$ and the edge intensity $Vn(x, y)$ according to the equation (1) and the equation (2).

Then, the procedure proceeds to step 1106 in which the correlation value CRR expressing the correlation between the contours of the time-varying patterns of the vibration intensities in the multiple frequency ranges and the reference model expressing the feature of the knock is computed according to the equation (3). Then, the procedure proceeds to step 1107 in which it is determined whether the correlation value CRR is smaller than the defect determination threshold.

The defect determination threshold may be the same value as the knock determination threshold, or may be a different value.

In step 1107, when it is determined that the correlation value CRR is smaller than the defect determination threshold, the knock sensor 28 cannot normally detect a knock actually caused. The procedure proceeds to step 1108 in which it is determined that the knock sensor 28 is faulty. Then, the procedure proceeds to step 1109 in which a fail-safe processing is performed. In the fail-safe processing, at least one of the processings of: stopping a vibration intensity extraction processing (knock determination processing); delaying the ignition timing; and stopping the knock control is performed. For example, when the knock sensor 28 is faulty, if the vibration intensity extraction processing (knock determination processing) is stopped, it is possible to prevent making an erroneous knock determination continuously on the basis of the faulty signal of the knock sensor 28. If the ignition timing is retarded, it is possible to prevent a knock from being caused. If the knock control is stopped, it is possible to avoid a situation where the ignition timing will be excessively advanced on the basis of the erroneous knock determination result to further impair a state where the knock is caused. The processing in step 1109 corresponds to a fail-safe means.

When it is determined in the step 1107 that the correlation value CRR is not smaller than the defect determination threshold, it means that the knock sensor 28 can normally detect the knock that is actually caused. Thus, the procedure proceeds to a step 1110, where it is determined that the knock sensor 28 is normal.

In the second embodiment described above, it is determined whether the correlation value CRR is smaller than the defect determination threshold during the period in which the ignition timing is advanced to compulsorily cause a knock, or during the period in which the engine is operated under the operating condition in which a knock is caused. With this, it can be determined with high accuracy whether the knock sensor 28 is faulty.

Third Embodiment

Figure 8:
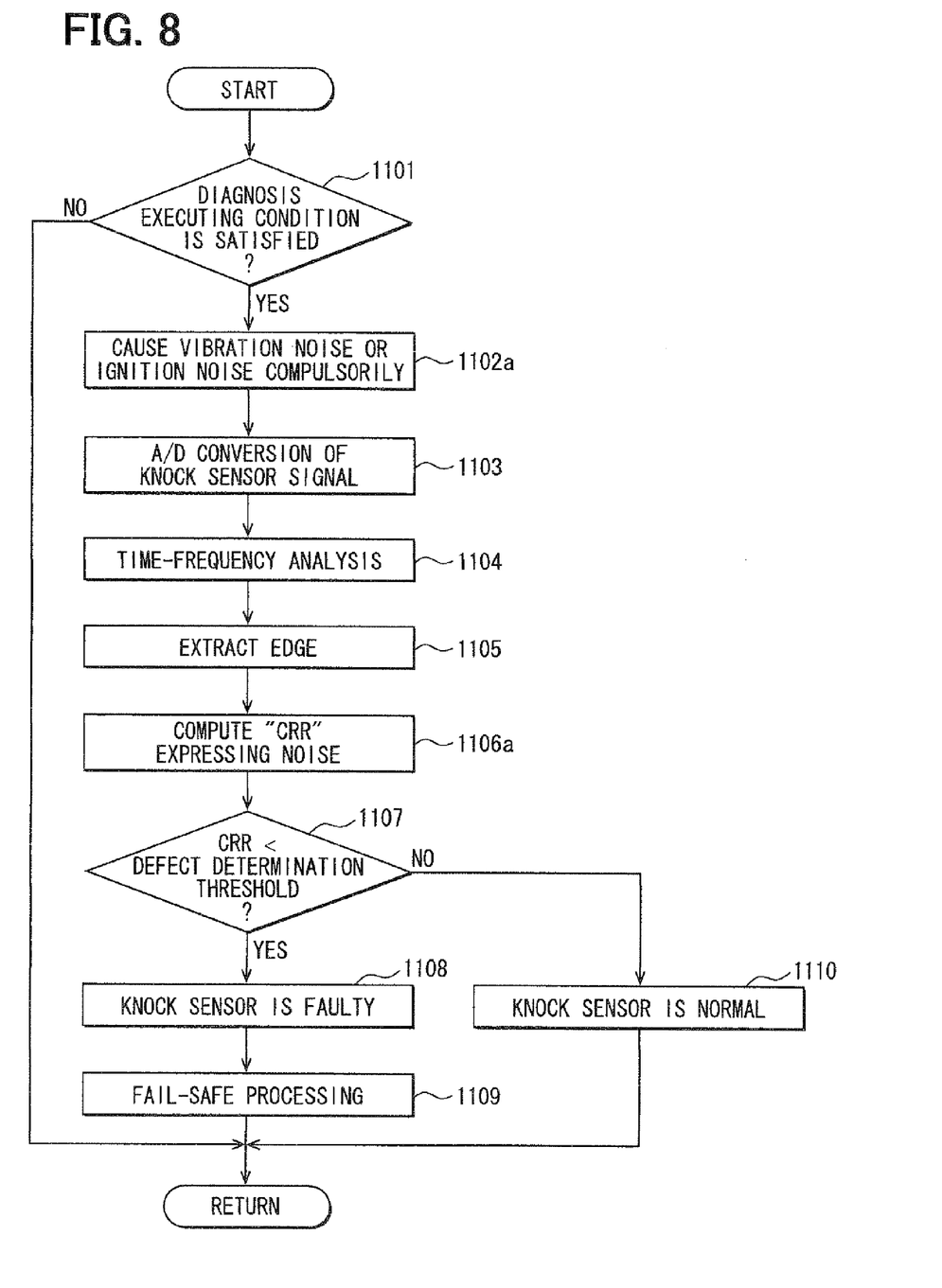
FIG. 8 is a flow chart showing a processing of a diagnosis routine according to a third embodiment.

In the third embodiment of the present invention, by performing a diagnosis routine shown in FIG. 8, a determination is made as to whether the knock sensor 28 is faulty on the basis of the correlation between the time-varying patterns of the vibration intensities of the multiple ranges, which are extracted by the time-frequency analysis part 42 during a period in which noise (vibration noise or ignition noise) is caused or during a period in which the noise is compulsorily caused, and a reference model for expressing the feature of noise (vibration noise or ignition noise).

The vibration noise includes, for example, a noise caused when the valve is seated, and a noise caused when the injector directly injects fuel. These vibration noises are characterized in that vibration rises in two frequency ranges at the same timing. Thus, if it is determined whether a time-varying pattern of a vibration intensity correlating with the reference model expressing the feature of the vibration noise can be detected during a period in which the vibration noise is actually caused, it can be determined with high accuracy whether the knock sensor 28 is faulty.

The ignition noise is a noise that is caused in one frequency range when the ignition timing is excessively retarded, so that when the ignition noise is caused, the knock is not caused. Thus, if it is determined whether a time-varying pattern of a vibration intensity correlating with the reference model expressing the feature of the ignition noise can be detected during a period in which the ignition noise is actually caused, it can be determined with high accuracy whether the knock sensor 28 is faulty.

The diagnosis routine shown in FIG. 8, which is performed in the third embodiment, is different from the diagnosis routine shown in FIG. 7 only in that the processings in steps S1102, S1106 in FIG. 7 are replaced by processings in steps S1102a, S1106a. The other steps in FIG. 8 are the same as those in FIG. 7.

In the diagnosis routine shown in FIG. 8, when a diagnosis executing condition is satisfied, the procedure proceeds to step 1102a in which a noise (a vibration noise or an ignition noise) is compulsorily caused. Alternatively, the routine may wait until a condition in which the noise (the vibration noise or the ignition noise) is caused is satisfied.

Then, in steps S1103 to S1105, the processing of extracting the edges (contours) of the time-varying patterns of the vibration intensities in the multiple frequency ranges, which are extracted from the output signal of the knock sensor 28, is performed by the same method as in the second embodiment to compute the edge direction θn(x, y) and the edge intensity Vn(x, y) according to the equation (1) and the equation (2).

Then, the procedure proceeds to step 1106a in which the correlation value CRR expressing the correlation between the contours of the time-varying patterns of the vibration intensities in the multiple frequency ranges and the reference model expressing the feature of the noise (vibration noise or ignition noise) is computed according to the equation (3). Then, the procedure proceeds to step 1107 in which the correlation value CRR is compared with the defect determination threshold. When the correlation value CRR is smaller than the defect determination threshold, the knock sensor 28 is in a state where the knock sensor 28 cannot normally detect the knock that is actually caused. The procedure proceeds to step 1108 in which it is determined that the knock sensor 28 is faulty. Then, in step 1109, the fail-safe processing described in the second embodiment is performed.

When it is determined in step 1107 that the correlation value CRR is not smaller than the defect determination threshold, the knock sensor 28 can normally detect the knock that is actually caused. The procedure proceeds to step 1110 in which it is determined that the knock sensor 28 is normal.

According to the third embodiment described above, the same advantage as those in the second embodiment can be obtained. The ignition timing may be retarded during the diagnosis of the knock sensor 28 in order to prevent causing the knock. With this, the diagnosis of the knock sensor 28 can be performed under a condition where only noise is caused without any knock, so that it is possible to increase the accuracy of diagnosis of the knock sensor 28.

Fourth Embodiment

Figure 9:
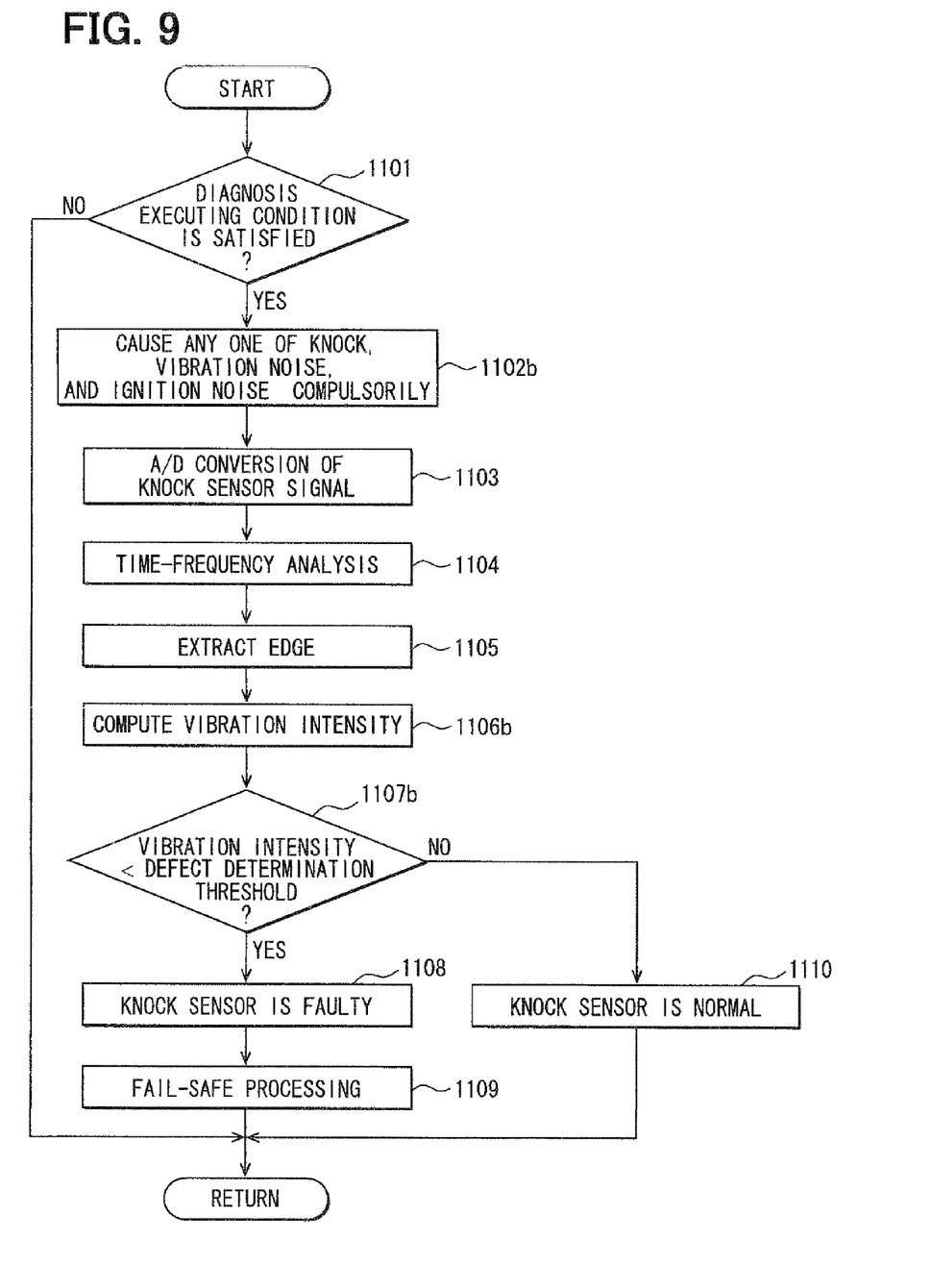
FIG. 9 is a flow chart showing a processing of a diagnosis routine according to a fourth embodiment.

In a fourth embodiment of the present invention, a diagnosis routine shown in FIG. 9 is performed. The computer determines whether the knock sensor 28 is faulty on the basis of the vibration intensity of at least one frequency range in the multiple frequency ranges during a period in which any one of the knock, the vibration noise, and the ignition noise is caused or during a period in which any one of the knock, the vibration noise, and the ignition noise is compulsorily caused. The frequency ranges are extracted by the time-frequency analysis part 42.

The frequency range in which vibration is caused by the knock, the vibration noise, or the ignition noise is an already known frequency range. If the vibration intensity in the frequency range in which vibration is caused by the knock (or the vibration noise or the ignition noise) is larger than an defect determination threshold, the knock sensor 28 can normally detect the vibration caused by the knock (or the vibration noise or the ignition noise) that is actually caused, so that it can be determined that the knock sensor 28 is normal. However, if the vibration intensity in the frequency range is not larger than the defect determination threshold, the knock sensor 28 cannot detect the vibration that is actually caused, so that it can be determined that the knock sensor 28 is faulty.

The diagnosis routine shown in FIG. 9 is different from the diagnosis routine shown in FIG. 7 only in that the processings in steps S1102, S1106, S1107 are replaced by processings in steps S1102*a*, S1106*b*, S1107*b*. The other steps are the same as those in the routine shown in FIG. 7.

When a diagnosis executing condition is satisfied, the procedure proceeds to step 1102*b* in which any one of the knock, the vibration noise, and the ignition noise is compulsorily caused. Alternatively, the routine may wait until a condition in which any one of the knock, the vibration noise, and the ignition noise is caused is satisfied.

Then, in steps S1103 to S1105, the processing of extracting the edges (contours) of the time-varying patterns of the vibration intensities in the multiple frequency ranges from the output signal of the knock sensor 28 is performed by the same method as in the second embodiment. Then, the procedure proceeds to step 1106*b* in which the vibration intensity is computed. The vibration intensity corresponds to an area of the time-varying pattern of the vibration intensity in the frequency range in which the present vibration is caused. The present vibration includes the knock, the vibration noise, and the ignition noise. When vibration is caused in multiple frequency ranges, the total value or the average value of the vibration intensities of these frequency ranges may be computed. Alternatively, the vibration intensity of one typical frequency range selected from the multiple frequency ranges in which the vibration is caused may be computed.

Then, the procedure proceeds to step 1107*b* in which the vibration intensity is compared with the defect determination threshold. When the vibration intensity is smaller than the defect determination threshold, the knock sensor 28 cannot normally detect the vibration (any one of the knock, the vibration noise, and the ignition noise) that is actually caused. The procedure proceeds to step 1108 in which it is determined that the knock sensor 28 is abnormal. Then, in step 1109, the fail-safe processing is performed.

When it is determined in step 1107*b* that the vibration intensity is not smaller than the defect determination threshold, the knock sensor 28 can normally detect the vibration (any one of the knock, the vibration noise, and the ignition noise) that is actually caused. The procedure proceeds to step 1110 in which it is determined that the knock sensor 28 is normal. Also in the fourth embodiment described above, the same advantage as those in the second embodiment can be obtained.

Fifth Embodiment

In the second to fourth embodiments described above, the time-frequency analysis part 42 of the knock determination circuit 33 performs the time-frequency analysis of the output signal of the knock sensor 28 to extract the time-varying patterns of the vibration intensities in the multiple frequency ranges. In a fifth embodiment shown in FIG. 10, a knock determination circuit 50 is provided with multiple band pass filters (a first BPF 51 to a fifth BPF 55) for extracting the time-varying patterns of the vibration intensities in the multiple frequency ranges from the output signal of the knock sensor 28, which is converted to a digital value by the AD conversion part 41. A knock determination/diagnosis part (a diagnosis means) 56 determines whether the knock sensor 28 is abnormal according to any one of the methods in the second to fourth embodiments by use of the time-varying patterns of the vibration intensities in the multiple frequency ranges extracted by the respective BPF 51 to 55.

Figure 10:
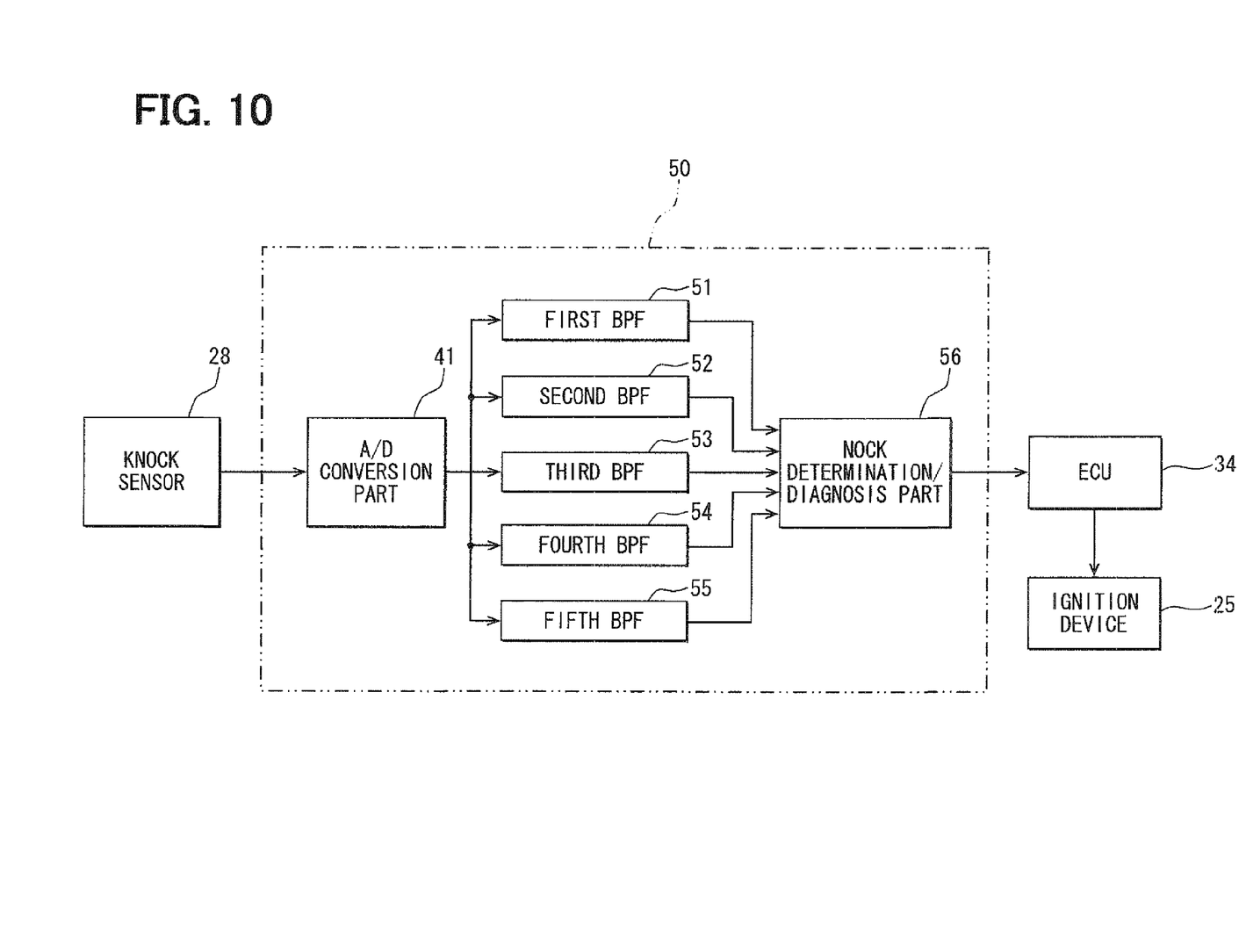
FIG. 10 is a block diagram showing a circuit for processing the output signal of a knock sensor to execute a knock determination and a diagnosis according to a fourth embodiment.

The frequency ranges extracted by the first to the fifth BPF 51 to 55 are a first-order frequency range (basic frequency band of knock vibration) and multiple higher-order frequency ranges. The first-order frequency range (pass band of the first BPF 51) is set to a frequency range including a basic frequency that is the lowest frequency of the frequencies of the knock vibration. The basic frequency is a first-order resonance frequency determined by the diameter of the bore of the cylinder, for example, approximately 7 kHz. The multiple higher-order frequency ranges (pass bands of the respective second to fifth BPF 52 to 55) are set to frequency ranges of approximately, for example, 12 kHz, 15 kHz, 17 kHz, and 21 kHz. The number of the BPF 51 to 55 is not limited to five but may be three, four, or six or more. The other configuration of the fifth embodiment is the same as those of any one of the second to fourth embodiments.

Also in the fifth embodiment described above, the same effect as in the second embodiment can be produced. In the second to fifth embodiments, the knock sensor 28 is used as the knock signal output means of which output signal waveform is varied according to the knock caused during the engine operation. Alternatively, a cylinder pressure sensor for detecting a cylinder pressure or an ion current detection means for detecting ions produced by the combustion of the air-fuel mixture in the cylinder through the ignition plug 21 or the like may be used as the knock signal output means.

The present invention is not limited to a direct injection engine shown in FIG. 1 but can be applied also to an intake port injection engine and a dual injection engine having fuel injectors mounted in both of the intake port and the cylinder. Further, the present invention can be applied to an engine not mounted with a variable valve unit such as a variable valve timing controller. The present invention can be variously modified and put into practice within a range not departing from the spirit and scope of the present invention.

What is claimed is:

1. A knock detection device for an internal combustion engine, the knock detection device comprising:
    a knock signal output means for outputting an output signal of which waveform is varied according to a knock caused while the internal combustion engine is operated;
    a multiple-frequency-ranges vibration intensity extraction means for extracting time-varying patterns of vibration intensities in multiple frequency ranges from the output signal of the knock signal output means; and
    a knock determination means for evaluating a correlation between the time-varying patterns of vibration intensities in multiple frequency ranges and a reference model expressing a feature of the knock in order to make a knock determine on the basis of the correlation;
    wherein the knock determination means compares a correlation value with a determination threshold in order to make a knock determination, the correlation value being an evaluation of the correlation between the time-varying patterns of vibration intensities in multiple frequency ranges and the reference model expressing a feature of the knock.

2. A knock detection device according to claim 1, wherein the determination threshold is established for each operating condition of the internal combustion engine.

3. A knock detection device according to claim 1, wherein the knock determination means corrects the determination threshold according to a knock detection frequency.

4. A knock detection device for an internal combustion engine, the knock detection device comprising:
- a knock signal output means for outputting an output signal of which waveform is varied according to a knock caused while the internal combustion engine is operated;
- a multiple-frequency-ranges vibration intensity extraction means for extracting time-varying patterns of vibration intensities in multiple frequency ranges from the output signal of the knock signal output means; and
- a knock determination means for evaluating a correlation between the time-varying patterns of vibration intensities in multiple frequency ranges and a reference model expressing a feature of the knock in order to make a knock determination on the basis of the correlation;
- wherein the knock determination means starts an evaluation of the correlation between the time-varying patterns of vibration intensities in multiple frequency ranges and the reference model from when the vibration intensities in multiple frequency ranges are rapidly increased simultaneously.

5. A knock detection device for an internal combustion engine, the knock detection device comprising:
- a knock signal output means for outputting an output signal of which waveform is varied according to a knock caused while the internal combustion engine is operated;
- a multiple-frequency-ranges vibration intensity extraction means for extracting time-varying patterns of vibration intensities in multiple frequency ranges from the output signal of the knock signal output means; and
- a knock determination means for evaluating a correlation between the time-varying patterns of vibration intensities in multiple frequency ranges and a reference model expressing a feature of the knock in order to make a knock determination on the basis of the correlation;
- wherein the knock determination means conducts no evaluation of the correlation between the time-varying patterns of vibration intensities in multiple frequency ranges and the reference model with respect to a time-varying pattern of vibration intensity of a frequency range which shifts from other frequency ranges at a timing when the vibration intensity is rapidly increased.

6. A knock detection device for an internal combustion engine, the knock detection device comprising:
- a knock signal output means for outputting an output signal of which waveform is varied according o a knock caused while the internal combustion engine is operated;
- a multiple-frequency-ranges vibration intensity extraction means for extracting time-varying patterns of vibration intensities in multiple frequency ranges from the output signal of the knock signal output means; and
- a knock determination means for evaluating a correlation between the time-varying patterns of vibration intensities in multiple frequency ranges and a reference model expressing a feature of the knock in order to make a knock determination on the basis of the correlation;
- wherein the knock determination means continues evaluating the correlation between the time-varying patterns of vibration intensities in multiple frequency ranges and the reference model until a vibration intensity of a frequency range in which vibration continues to the last time attenuates to a value smaller than a specified value.

7. A knock detection device for an internal combustion engine, the knock detection device comprising:
- a knock signal output means for outputting an output signal of which waveform is varied according to a knock caused while he internal combustion engine is operated;
- a multiple-frequency-ranges vibration intensity extraction means for extracting time-varying patterns of vibration intensities in multiple frequency ranges from the output signal of the knock signal output means;
- a knock determination means for evaluating a correlation between the time-varying patterns of vibration intensities in multiple frequency ranges and a reference model expressing a feature of the knock in order to make a knock determination on the basis of the correlation; and
- a reference model correction means for correcting the reference model on the basis of a time-varying pattern of vibration intensity in which it is determined that a knock is caused.

8. A knock detection system diagnosis device comprising:
- a knock signal output means for outputting and output signal of which waveform is varied according to a knock vibration caused while the internal combustion engine is operated;
- a multiple-frequency-ranges vibration intensity extraction means for extracting time-varying patterns of vibration intensities in multiple frequency ranges from the output signal of the knock signal output means; and
- a diagnosis means for evaluating a correlation between the time-varying patterns of vibration intensities in multiple frequency ranges and a reference model expressing a feature of the knock, the time-varying patterns of vibration intensity being extracted by the multiple-frequency-ranges vibration intensity extraction means during a period in which the internal combustion engine is operated under an operating condition in which knock is caused or during a period in which an ignition timing is advanced to compulsorily cause a knock, the diagnosis means determining whether the knock signal output means is faulty on the basis of the correlation;
- wherein the multiple-frequency-ranges vibration intensity extraction means processes an output signal of the knock signal output means by a plurality of band pass filters extracting a plurality of specified frequency ranges to extract the time-varying patterns of vibration intensities in multiple frequency ranges.

* * * * *